Dec. 29, 1970  N. R. GRISWOLD  3,551,000
COMBINATION BOAT DOLLY AND REINFORCING MEANS
Filed Sept. 3, 1968
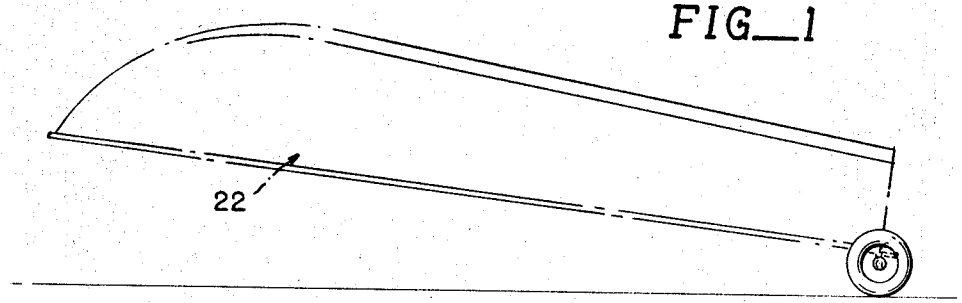
FIG_1
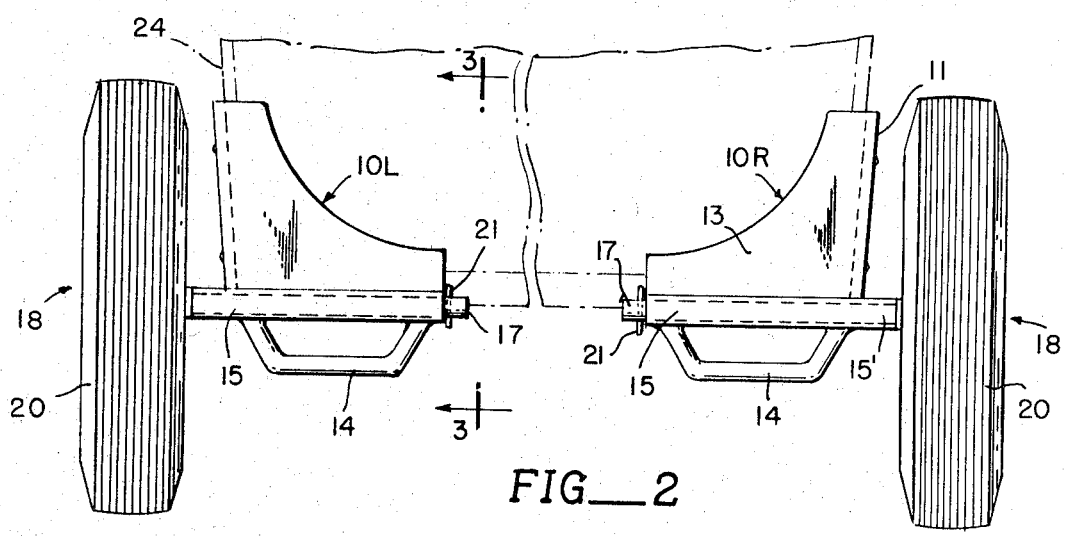
FIG_2
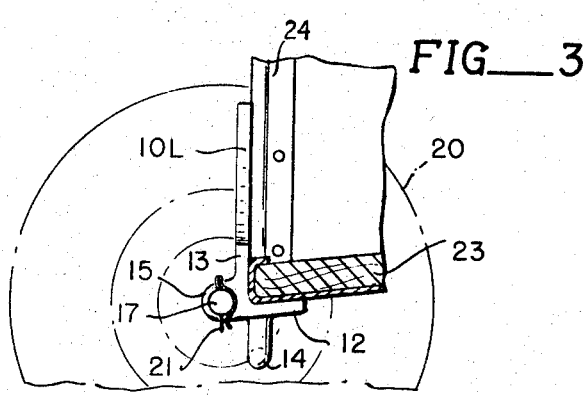
FIG_3
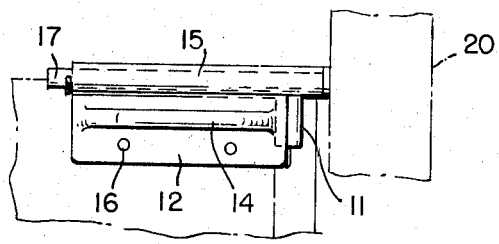
FIG_4
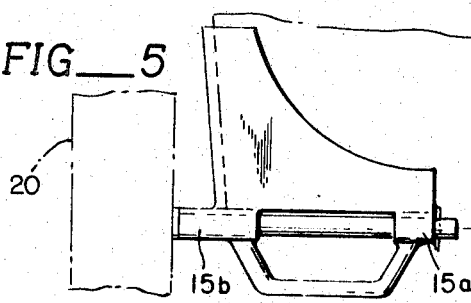
FIG_5
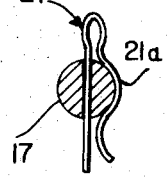
FIG_6
NORMAN R. GRISWOLD
INVENTOR.
BY
ATTORNEYS United States Patent Office 3,551,000
Patented Dec. 29, 1970

3,551,000
COMBINATION BOAT DOLLY AND
REINFORCING MEANS
Norman R. Griswold, 4237 S. 252nd St.,
Kent, Wash. 98031
Filed Sept. 3, 1968, Ser. No. 756,789
Int. Cl. B26b 1/26
U.S. Cl. 280—47.32                                    5 Claims

ABSTRACT OF THE DISCLOSURE

Combination boat dolly and corner reinforcing means in which the rear corners of the boat have reinforcing corner brackets receiving alined plug-in wheels and having handles.

---

The present invention relates to wheel attachments for small boats of the car-top variety to provide mobility for ease of moving the boat to the water from the automobile or storage site.

An important object of the invention is to provide a boat dolly or caddy assembly having readily detachable wheel assemblies and wherein the mounting structure for the wheels remains fixed to the boat and has additional functions. More specifically the invention aims to provide such an assembly which will also provide rear corner reinforcement for a boat and convenient lifting handles.

As a further object the invention aims to provide a wheel attachment assembly of unusually simple and economical construction having a minimum of parts and which is rugged, reliable, and easy to use.

Other more particular objects and advantages of the invention will, with the foregoing, appear and be understood in the course of the following description and claims, the invention consisting in the novel construction and in the adaptation and combination of parts hereinafter described and claimed.

In the accompanying drawings:

FIG. 1 is a side elevational view of a boat equipped with the present invention;

FIG. 2 is a top plan view of a pair of right and left hand units embodying the invention and illustrated mounted on a boat shown fragmentarily;

FIG. 3 is a side elevational view taken as indicated by line 3—3 of FIG. 2;

FIG. 4 is a rear elevational view of the right hand unit;

FIG. 5 is a top elevational view of a modified unit; and

FIG. 6 is a detail end view illustrating the quick-release retainer in position.

Referring to the drawings it is seen that the present invention includes a pair of complementary starboard and port corner reinforcing brackets 10R–10L each presenting a side flange 11, a transom flange 12, and a gunwale web 13. These parts 11–13 are preferably cast integrally together with a handle 14 and a boss 15. The handle 14 projects rearwardly from the transom flange 12 and the boss 15 extends in a thwartships direction at the rear of the bracket at a level above the top of the transom flange 12. Pilot holes 16 are provided in the flanges 11–12 to receive screws, bolts, or rivets for securing the brackets to the hull of a boat at the rear corners as indicated in FIG. 2.

The bosses 15 are adapted to receive a pair of alined stub shafts 17 provided by a pair of "plug-in" wheel assemblies 18. The wheels 20 of these assemblies may be journaled on the shafts 17 or may be fixed thereto and turn therewith in the bosses 15. At their free ends the stub shafts 17 are each provided with quick-release retaining devices, as for example, a cotter pin 21 with one leg extending through a hole in the shaft and the other leg 21a springing around the shaft, or a spring-loaded pin (not shown).

The dihedral angle between the side and transom flanges 11–12 of each unit can be varied in production depending upon the taper of the boat hull 22 with which it is to be used. To insure clearance between the wheels 20 and the side of the hull, the bosses 15 may be projected endwise at their outer end as shown at 15'.

The handles 14 may extend from the transom flanges as shown in FIGS. 3–4 or can be made integral with the bosses 15 as shown, for example, in FIG. 5. Also, as illustrated in the latter, the bosses 15 can comprise two alined ears 15a–15b rather than a single elongated boss.

The reinforcing functions of the corner brackets 10 are particularly advantageous for use with aluminum boats of light construction to give added support for the transom. In such boats the side and bottom edges of the transom skin are bent forwardly as flanges which are riveted or welded to the side and bottom skins. A wood transom plate 23 is usually provided along the top of the inside face of the transom skin for added transom thickness to receive the mounting clamps of an outboard motor, and the top edges of the side skins are normally finished by gunwhale molding strips 24 which terminate at the transom plate. When the brackets of the present invention are mounted on such a hull the transom flange 12 is preferably bolted through the transom skin and plate 23 as indicated in FIG. 3 and the side flange 11 is riveted or otherwise secured to the side skin of the hull and preferably also to the gunwhale molding 24. In this way the brackets 10 serve an important and useful reinforcing function for the boat and are so located that a minimum strain is placed on the hull when the wheel assemblies 18 are in use for wheeling the boat as shown in FIG. 1.

The present invention is not only useful in manually wheeling the boat to and from a launching site but is helpful in loading and unloading the boat onto and off an automobile or other vehicle roof rack. The wheel assemblies can be easily removed when desired, as after launching the boat, merely by releasing the retainer 21 and pulling the stub shafts 17 free, and can be readily plugged back into operative position when required.

It is believed that the invention will have been clearly understood from the foregoing detailed description of my now-preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

The embodiments of the invention in which an exclusive property or privilege is claimed are defined as follows:

1. Combination dolly and corner reinforcing means for a boat comprising, a pair of right and left hand reinforcing corner brackets each comprising a transom flange, a side flange extending forwardly from the transom flange and forming a dihedral angle therewith, a gunwhale web gusseting between the upper edges of said flanges, a journal athwart the bracket, a handle projecting rearwardly from the transom flange, and openings through said flanges for receiving fastening devices to secure them against the outer faces of the respective side and transom of a boat at a respective one of the rear corners thereof with the journals of the brackets alined thrawtships; and a pair of right and left hand plug-in wheel assemblies for said brackets each comprising a wheel spaced outwardly from the side flange of the respective bracket, a stub shaft projecting from said wheel into the journal of the respective bracket, and quick-release retaining means for limiting endwise movement of the shaft relative to the journal.

2. The combination according to claim 1 in which each journal comprises a boss extending above the upper level of the respective gunwhale web at the intersection of the web with the adjoining transom flange.

3. The combination according to claim 1 in which each journal comprises two laterally-spaced alined bosses on the respective transom flange receiving the stub shaft of the respective wheel assembly with the respective quick-release retaining means arranged on the stub shaft to engage the inner end of one of the two bosses.

4. The combination according ot claim 1 in which each of said corner brackets is of one-piece construction, has its journal located at the intersection of its transom flange and gunwhale web, and has its handle on the transom flange spaced below said intersection.

5. Combination dolly and corner reinforcing means for a boat comprising, a pair of right and left hand reinforcing corner brackets each comprising a transom flange, a side flange extending forwardly from the transom flange and forming a dihedral angle therewith, a gunwhale web gusseting between the upper edges of said flanges, a journal athwart the bracket comprising a boss extending above the upper level of the respective gunwhale web at the intersection of the web with the adjoining transom flange and projecting endwise outwardly beyond the rest of the bracket, and openings through said flanges for receiving fastening devices to secure them against the outer faces of the respective side and transom of a boat at a respective one of the rear corners thereof with the journals of the brackets alined thwartships; and a pair of right and left hand plug-in wheel assemblies for said brackets each comprising a wheel spaced outwardly from the side flange of the respective bracket by the projecting end of the respective boss, a stub shaft projecting from said wheel into the journal of the respective bracket, and quick-release retaining means for limiting endwise movement of the shaft relative to the journal.

References Cited
UNITED STATES PATENTS

| | | | |
|---|---|---|---|
| 400,817 | 4/1889 | Allen | 301—132 |
| 2,174,661 | 10/1939 | Hope et al. | 280—47.32X |
| 2,612,388 | 9/1952 | McNeill et al. | 280—47.32X |
| 3,301,571 | 1/1967 | Malcolm | 280—47.32 |

BENJAMIN HERSH, Primary Examiner

J. A. PEKAR, Assistant Examiner

U.S. Cl. X.R.

9—1